United States Patent
Kakuchi et al.

(10) Patent No.: US 6,770,737 B2
(45) Date of Patent: Aug. 3, 2004

(54) PROCESS FOR PRODUCING POLYMERS HAVING OXETANYL GROUP ON SIDE CHAIN

(75) Inventors: Toyoji Kakuchi, Sapporo (JP); Hiroshi Sasaki, Tsukuba (JP); Akira Kuriyama, Tsukuba (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 10/102,652

(22) Filed: Mar. 22, 2002

(65) Prior Publication Data

US 2002/0137868 A1 Sep. 26, 2002

Related U.S. Application Data

(63) Continuation of application No. 08/751,386, filed on Nov. 19, 1996, now abandoned.

(30) Foreign Application Priority Data

Nov. 20, 1995 (JP) .............................................. 7-325150

(51) Int. Cl.[7] .............................................. C08G 59/00
(52) U.S. Cl. ........................ 528/406; 528/417; 528/418
(58) Field of Search ................................ 528/418, 417, 528/406

(56) References Cited

U.S. PATENT DOCUMENTS

| 3,356,630 A | 12/1967 | Vona et al. |
| 3,457,193 A | 7/1969 | Tinsley et al. |

FOREIGN PATENT DOCUMENTS

| JP | 45-16466 | 6/1970 |
| JP | 50-28992 | 9/1975 |
| JP | 50-28993 | 9/1975 |
| JP | 9-3386 | 1/1997 |

OTHER PUBLICATIONS

Odian, G, "Principles of Polymerization". Third Edition (1991), 535–536, Wiley (New York).*
Uno, K., "The Synthesis and Cross–linking of Self Cross–linking Polyesters Containing Oxy–rings," Journal of Adhesive Society in Japan, vol. 26 No. 3, pp. 92–99 (1990).
Takeuchi et al., "Controlled Coordinate Anionic Polymerization of Oxetane by Novel Initiating Systems: Onium Salts/Bulky Organoaluminum Diphenolates", Macromolecules 1996, 29, 8096–8100.
Bulascovschi, V. and Simionescu, C.I., "Polymers with oxetane pendant groups," Acta Polyamerica 36 Nr pp. 192–196 (1985).
Liu, Y., Hsiue, G., Chiu, Y. & Jeng, R., "New Addition Reaction of Polymers Carrying Pendent Oxetane Synethesis of a Nonlinear Optical Polymer," Journal of Polymer Science: Part A: Polymer Chemistry, vol. 32, pp. 3201–3204 (1994).
Biphenyl Derivatives and the Use of these Polymers in the Asymmetric Reactions, Rep. Asahi Glass. Found. Ind. Technol., vol. 46, pp. 273–282 (1985).

* cited by examiner

*Primary Examiner*—Bernard Lipman
(74) *Attorney, Agent, or Firm*—Sughrue Mion, PLLC

(57) ABSTRACT

Polymers having an oxetanyl group on the side chain and being represented by the following formula (2) are provided. They are usable for reactions such as ring-opening reaction and addition reaction. The process comprises subjecting to anionic ring-opening polymerization a 3-[(oxiranylmethoxy)methyl]oxetane monomer represented by the following formula (1) alone or together with other monomer containing an epoxy group:

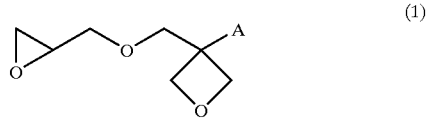

(1)

wherein A represents a hydrogen atom or an alkyl group of 1–6 carbon atoms,

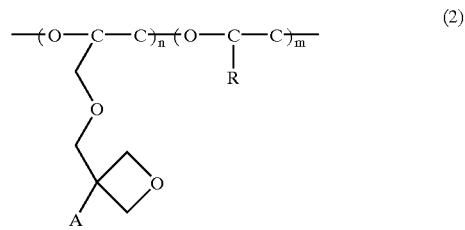

(2)

wherein A is the same as above, and R represents a hydrogen atom, a chloromethyl group, straight chain alkyl group or branched chain alkylene group of 1–12 carbon atoms, phenyl group, straight or branched chain alkyloxymethyl group of 1–12 carbon atoms or phenoxymethyl group, and n and m each represent a molar fraction, n being 100–1 mol %, m being 0–99 mol % with n+m=100.

7 Claims, 4 Drawing Sheets

PROCESS FOR PRODUCING POLYMERS HAVING OXETANYL GROUP ON SIDE CHAIN

This application is a continuation of U.S. application Ser. No. 08/751,386, filed Nov. 19, 1996.

BACKGROUND OF THE INVENTION

The present invention relates to a process for producing polymers containing an oxetanyl group on the side chain which are utilizable for various reactions such as ring-opening polymerization and addition reaction. Furthermore, the polymers obtained by the process of the present invention can be used, for example, as a main component of ultraviolet-curing compositions which cure upon irradiation with ultraviolet rays.

The ultraviolet-curing techniques are very important in the industries such as coating for wood, coating for metals and printing taking advantage of high curing rate, good operability with requiring usually no solvents and very small energy quantity needed. Especially, it is known that ultraviolet-curing resins having an oxetane ring which is a 4-membered cyclic ether are much higher than epoxy resins in curing rate when irradiated with ultraviolet rays. Furthermore, it is expected that, when polymers represented by the formula (2) mentioned hereinafter which have an oxetanyl group on the side chain, said group having large ring-opening polymerizability, are used for ultraviolet-curing resins, the resulting resins are excellent in surface hardness and heat resistance.

The above polymers having an oxetanyl group on the side chain are produced by ring-opening polymerizing 3-[(oxiranylmethoxy)methyl]oxetane monomers represented by the formula (1) referred to hereinafter which contain an oxetane ring and an oxirane ring in the molecule. However, hitherto only cationic polymerization was employed and, therefore, both the oxirane ring and the oxetane ring simultaneously undergo ring-opening. As the result, the desired polymers having an oxetanyl group on the side chain are obtained in only very small yields.

SUMMARY OF THE INVENTION

An object of the present invention is to provide a process for producing, in high yields, polymers having an oxetanyl group on the side chain which can perform various reactions such as ring-opening polymerization and addition reaction.

The inventors have found that polymers having an oxetanyl group on the side chain and represented by the formula (2) can be produced by subjecting to anionic ring-opening polymerization a 3-[(oxiranylmethoxy)methyl]oxetane monomer represented by the formula (1) alone or together with other monomers having an epoxy group.

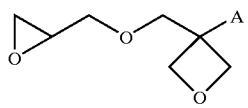

(1)

wherein A represents a hydrogen atom or an alkyl group of 1–6 carbon atoms.

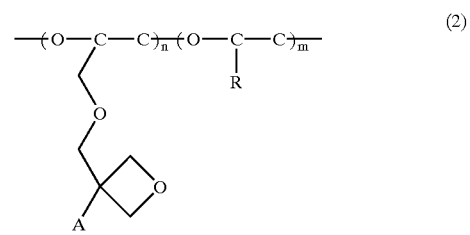

(2)

wherein A is as defined above, and R represents a hydrogen atom, a chloromethyl group, straight chain alkyl group or branched chain alkylene group of 1–12 carbon atoms, phenyl group, straight or branched chain alkyloxymethyl group of 1–12 carbon atoms or phenoxymethyl group, and n and m each represent a molar fraction, n being 100 –1 mol %, m being 0–99 mol % with n+m=100.

DETAILED DESCRIPTION OF THE INVENTION

Figure 1:
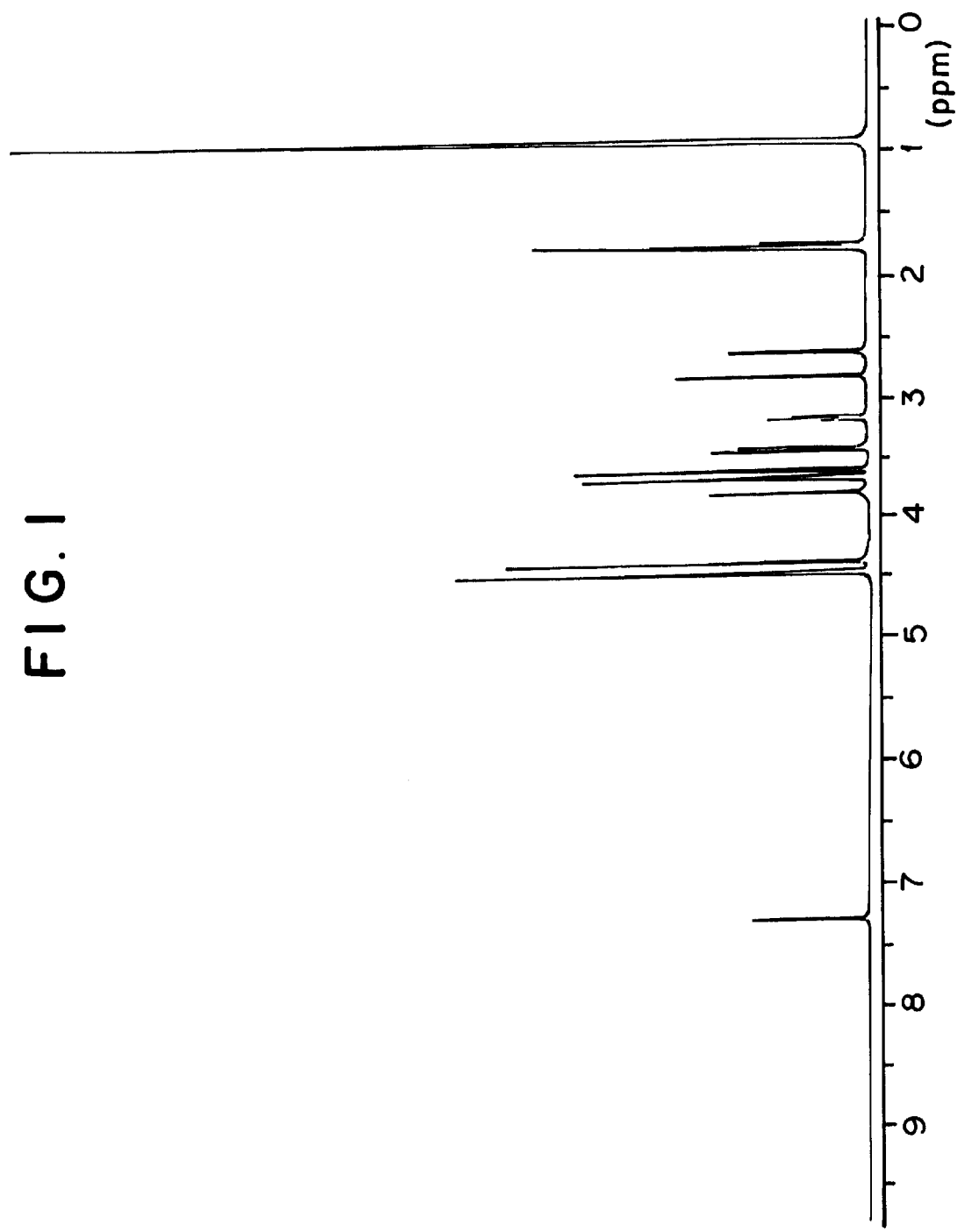
FIG. 1 shows a proton nuclear magnetic resonance spectrum of 3-ethyl-3-[(oxiranylmethoxy)methyl]oxetane.

The present invention is based on the discovery that when 3-[(oxiranylmethoxy)methyl]oxetane monomers represented by the formula (1) which are compounds having an oxetane ring and an oxirane ring in the molecule (hereinafter referred to as "oxetanyl group-containing monomers") are ring-opening polymerized by anionic polymerization, the oxatene ring remains as it is and only the oxirane ring is ring-opening polymerized.

The oxetanyl group-containing monomers used in the present invention are prepared by a reaction of 3-hydroxymethyloxetane represented by the formula (3) with epichlorohydrin represented by the formula (4) in high yields.

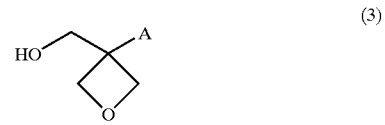

(3)

wherein A represents a hydrogen atom or an alkyl group of 1–6 carbon atoms.

(4)

If necessary, the oxetanyl group-containing monomer used in the present invention may be copolymerized with monomers containing an epoxy group (hereinafter referred to as "epoxy monomer"). As the epoxy monomers, there may be used various ones which have anionic polymerizability, such as ethylene oxide, epichlorohydrin, straight chain or branched chain alkylene oxides of 1–12 carbon atoms, styrene oxide, straight chain alkylglycidyl ethers or branched chain alkyleneglycidyl ethers of 1–12 carbon atoms and phenylglycidyl ether.

A process for producing polymers having an oxetanyl group on the side chain in the present invention comprises subjecting the oxetanyl group-containing monomer or a mixture of the oxetanyl group-containing monomer and the above-mentioned epoxy monomers at an optional ratio to anionic ring-opening polymerization in order to selectively ring-opening polymerize only the oxirane ring in the oxetanyl group-containing monomers and epoxy monomers.

The conditions of the anionic ring-opening polymerization are not critical. Any conditions generally employed may be applied. For example, as polymerization initiators, there may be used alkali metal hydroxides such as sodium hydroxide or potassium hydroxide, or alkali metal alcoholates such as sodium methylate or t-butoxypotassium. They are generally used for ring-opening polymerization of oxirane ring. Preference is t-butoxypotassium, because polymerization rate is large. An amount of the polymerization initiators is suitably 0.01–100 mmols for 1 mol of the monomer.

The anionic ring-opening polymerization can be carried out in the presence or absence of solvents. Preferably, the polymerization is carried out in the absence of solvents in view of the large polymerization rate.

Polymerization temperature for the anionic ring-opening polymerization is preferably −78° C.–150° C., more preferably 0° C.–80° C., depending on reactivity of the monomers used.

A period of time for polymerization varies depending on reactivity of monomers used and polymerization temperature, preferably 10 minutes to 20 hours.

The resulting polymers are purified by the generally employed washing, re-precipitation and the like.

The present invention will be explained specifically by the following examples.

EXAMPLE 1

Reagent used: 3-Ethyl-3-[(oxiranylmethoxy)methyl] oxetane (hereinafter referred to as "GlOx") subjected to distillation in the presence of $CaH_2$ Catalyst: Commercially available t-butoxypotassium (hereinafter referred to as "t-BUOK") subjected to sublimation Solvent: THF subjected to distillation in the presence of sodium-benzoquinone Polymerization method:

t-BUOK (23 mg, 0.205 mmol) was charged in one tube of an H-shaped tube made of glass and GlOx (1.14 g, 4.19 mmols) was charged in another tube in the presence of dry nitrogen. THF (2.1 ml) was added to the catalyst, and, then, the polymerization tube was sealed and kept at 60° C. Polymerization was started by mixing both the solutions. (The polymerization system showed light yellow color immediately after the polymerization, but did not gel.) After lapse of 48 hours, the reaction product was poured into a large amount of methanol in order to terminate the polymerization. Methanol was distilled off, followed by carrying out re-precipitation twice with a mixture of chloroform and n-hexane. Thereafter, the undissolved portion was dissolved in chloroform, followed by washing with water. Chloroform was distilled off, followed by carrying out azeotropy twice with benzene to obtain a polymer (0.73 g, 64.1%).

The resulting polymer was a viscous substance (light yellow) soluble in methanol, THF, chloroform or toluene, and insoluble in n-hexane.

EXAMPLE 2

Example 1 was repeated, except that toluene subjected to distillation in the presence of sodium-benzoquinone was used as the solvent.

EXAMPLE 3

Example 1 was repeated, except that the polymerization was carried out in the absence of the solvent.

EXAMPLES 4 AND 5

Example 1 was repeated, except that the polymerization was carried out in the absence of the solvent, but phenylglycidyl ether (hereinafter referred to as "PGE") subjected to distillation in the presence of $CaH_2$ was used as a comonomer.

The results are shown in Table 1.

TABLE 1

| Example | GlOx (g) | PEG (g) | Solvent (ml) | Initiator (mg) | Yield (%) | Number-average weight | Mw/Ma |
|---|---|---|---|---|---|---|---|
| 1 | 1.14 | 0 | THF (2.1) | t-BuOK (23) | 64.1 | 5,420 | 1.62 |
| 2 | 1.14 | 0 | Toluene (2.1) | t-BuOK (23) | 72.2 | 5,150 | 1.42 |
| 3 | 1.14 | 0 | None | t-BuOK (23) | 94.2 | 9,400 | 1.20 |
| 4 | 1.72 | 13.52 | None | t-BuOK (56) | 87.3 | 12,800 | 1.66 |
| 5 | 5.17 | 10.51 | None | t-BuOK (56) | 93.5 | 12,760 | 1.83 |

Figure 2:
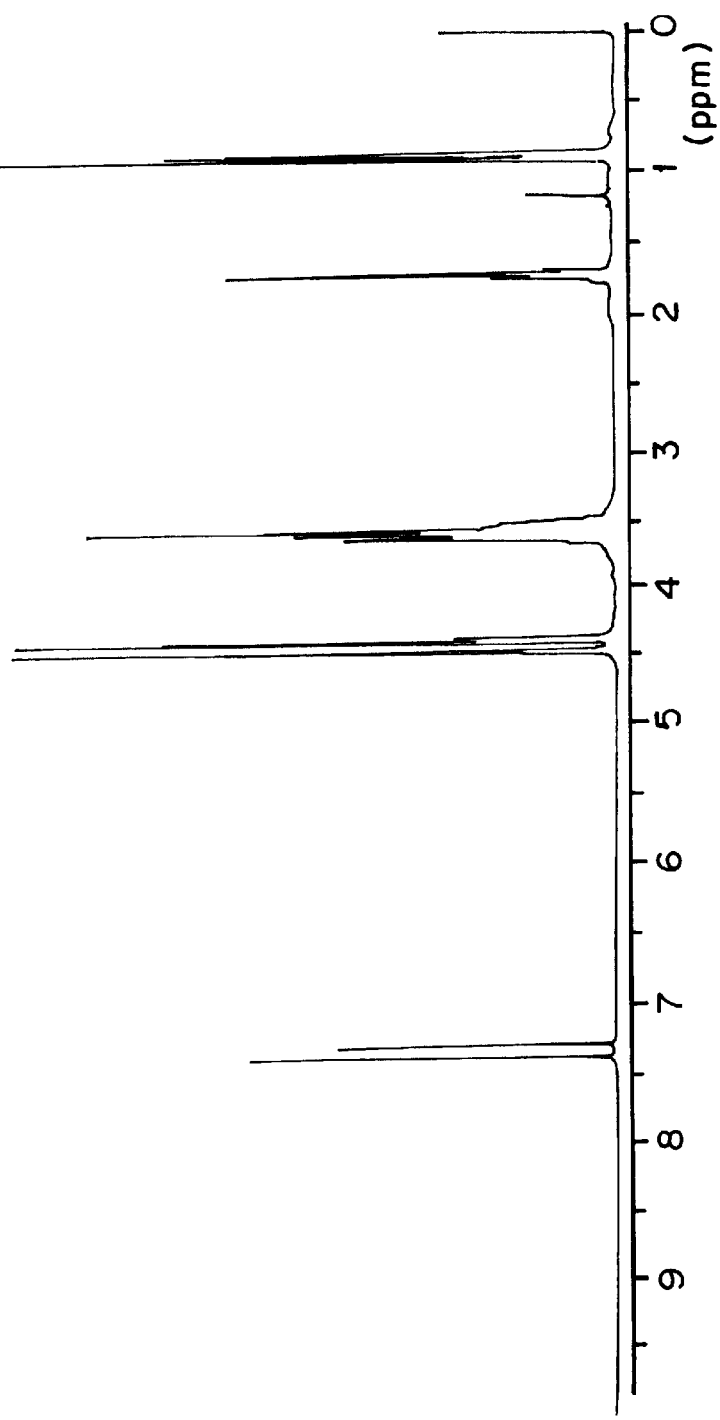
FIG. 2 shows a proton nuclear magnetic resonance spectrum of the polymer obtained in Example 1.

FIG. 1 and FIG. 2 show proton nuclear magnetic resonance spectrum of GlOx used as the monomer and that of the polymer obtained in Example 1. The peaks of the hydrogen atoms on the oxetane ring which are present at 4.3–4.4 ppm in FIG. 1 appear also in FIG. 2, while the peaks of the hydrogen atoms on the epoxy ring which are present at 2.5–3.5 ppm in FIG. 1 completely disappears in FIG. 2. From this fact, it is clear that in the Example, only the epoxy group was selectively polymerized to give a polymer containing an oxetanyl group on the side chain.

REFERENCE EXAMPLE 1

Photocationic Polymerization of a Polymer Having an Oxcetanyl Group in a Side Chain A mixture of the polymer having an oxetanyl group in a side chain and being obtained in Example 1 and diphenyl-4-thiophenoxyphenyl sulfonium hexafluoroantimonate, a photopolymerization initiator (0.5 mol %), was coated (10 μm thick) on an aluminium plate. Ultra-violet ray irradiation were effected under intensities of 21.2 and 123 $mW/cm^2$, respectively, in order to proceed with polymerization. Decrease in an oxetane ring was measured by infrared radiation (995 $cm^{-1}$) in order to observe polymerization degree.

Figure 3:
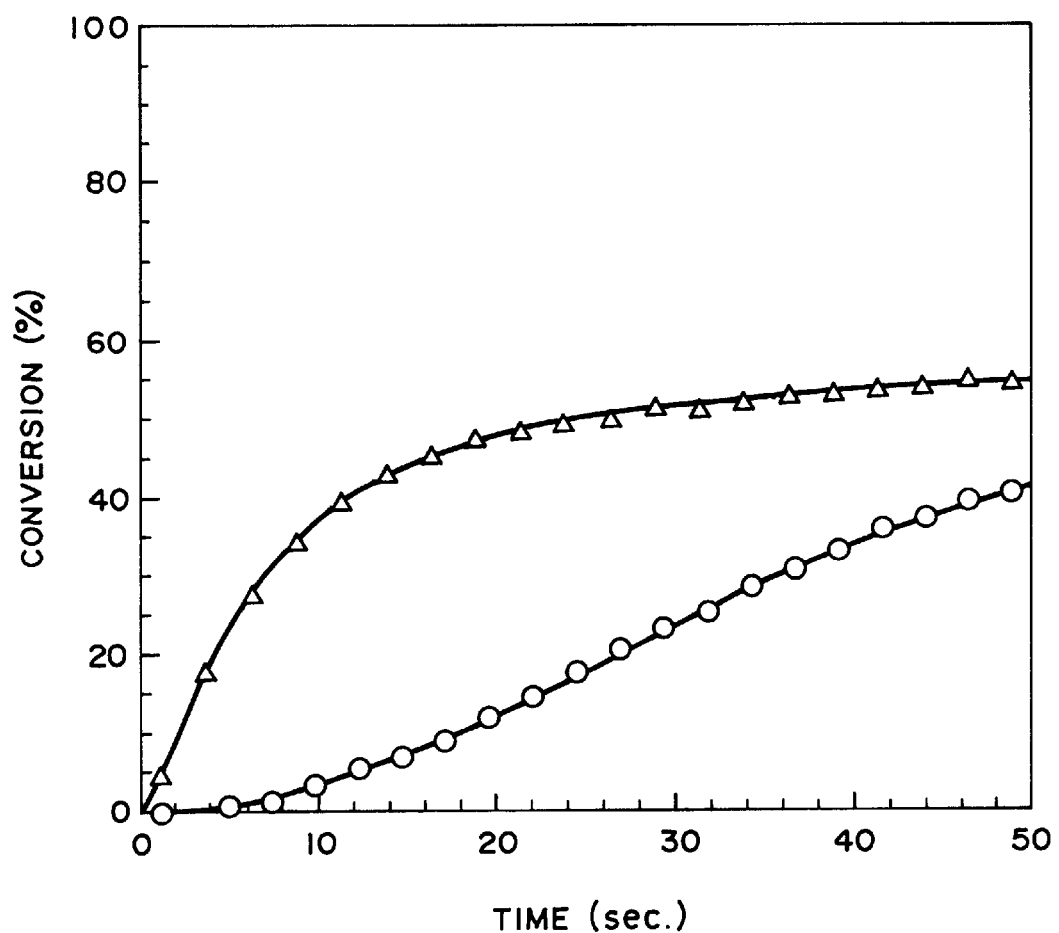
FIG. 3 shows conversion vs. irradiation time curves for polymerization in Reference Example 1.

The results are shown in FIG. 3 wherein ○ and Δ relate to UV intensities of 21.2 mW/cm² and 123 mW/cm², respectively. In FIG. 3, decrease in an oxetane ring reaches 40–50% and polymerization of the polymer having an oxcetanyl group in a side chain is seen.

REFERENCE EXAMPLE 2

Photocationic Polymerization between a Polymer Having an Oxcetanyl Group in a Side Chain and a Compound Having an Epoxy Group Reference Example 1 was repeated except that phenyl glycidyl ether (10 mol %) was added to the mixture, and ultra-violet ray irradiation was effected under intensity of 21.2 mW/cm² only.

Figure 4:
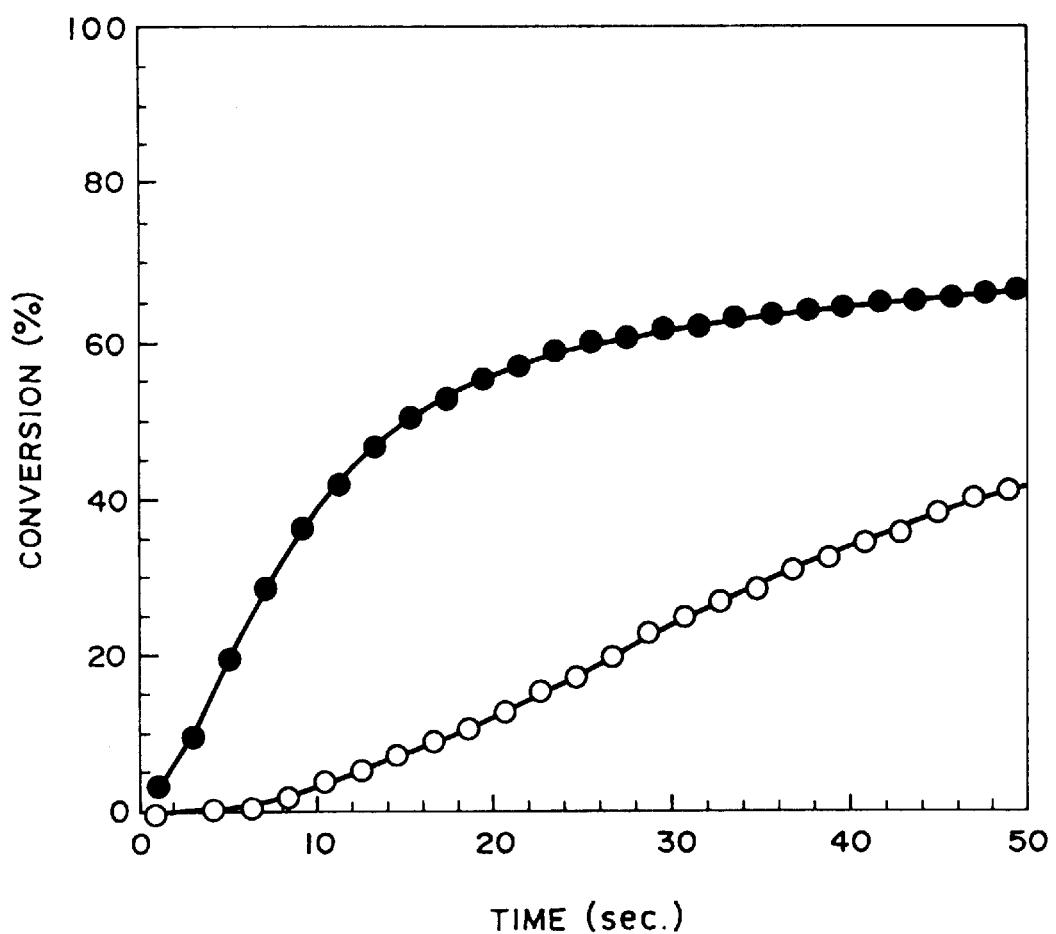
FIG. 4 shows conversion vs. irradiation time curves for polymerization in Reference Example 2.

The results are shown in FIG. 4 wherein ○ and ● relate to the polymer obtained in Example 1 and the polymer between the polymer obtained in Example 1 (90) and phenyl glycidyl ether (10). FIG. 4 shows that decrease in an oxetane ring is larger and polymerization occurs more violently, due to co-presence of a compound having an epoxy group.

According to the process of the present invention, polymers having an oxetanyl group on the side chain which can perform various reactions such as ring-opening polymerization and addition reaction can be produced economically and advantageously. For example, when the polymers are used in ultraviolet-curing compositions which cure upon irradiation with ultraviolet rays, the compositions can be rapidly cured by irradiation with light in a short period of time, and the cured products are excellent in adhesion, heat resistance and chemical resistance. The polymers are useful for such coating or printing materials as ink or paint.

What is claimed is:

1. A process for producing a polymer of formula (2) in high yield, which comprises subjecting a monomer of formula (1):

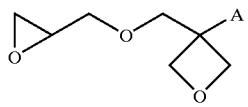 (1)

to ring-opening polymerization, alone or together with another monomer containing an epoxy group, to produce said polymer of formula (2):

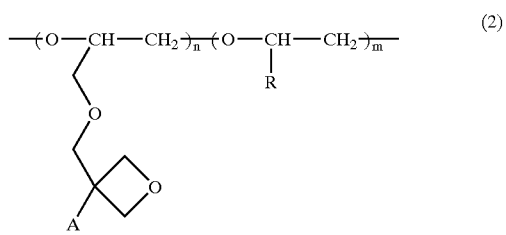

wherein A represents a hydrogen atom or an alkyl group of 1–6 carbon atoms and R represents a hydrogen atom, a chloromethyl group, straight chain alkyl group or branched chain alkylene group of 1–12 carbon atoms, phenyl group, straight or branched chain alkyloxymethyl group of 1–12 carbon atoms or phenoxymethyl group, and n and m each represent a molar fraction, n being 100–1 mol %, m being 0–99 mol % with n+m=100, said polymerization reaction being carried out in the presence of an anionic initiator at a temperature of −78° C. to 80° C., resulting in selective ring-opening polymerization of the oxirane ring of the monomer of formula (1) but not the oxetane ring of the monomer of formula (1).

2. The process according to claim 1, wherein said anionic initiator is an alkali metal hydroxide or an alkali metal alcoholate.

3. The process according to claim 2, wherein said anionic initiator is t-butoxypotassium.

4. The process according to claim 1, wherein said temperature is from 0° C. to 80° C.

5. The process according to claim 1, wherein said polymerization reaction is carried out for 10 minutes to 20 hours.

6. The process according to claim 1, wherein said polymerization reaction is carried out in the absence of a solvent.

7. The process according to claim 1, wherein the other monomer containing an epoxy group is present during polymerization, and is selected from ethylene oxide, epichlorohydrin, a straight chain or branched chain alkylene oxide of 1–12 carbon atoms, styrene oxide, straight chain alkylglycidyl ether or 1–12 branched chain alkyleneglycidyl ether of 1–12 carbon atoms or phenylglycidyl ether.

* * * * *